(12) United States Patent
Marushak et al.

(10) Patent No.: US 7,366,958 B2
(45) Date of Patent: Apr. 29, 2008

(54) RACE CONDITION PREVENTION

(75) Inventors: Nathan E. Marushak, Gilbert, AZ (US); Roger C. Jeppsen, Gilbert, AZ (US); Richard C. Beckett, Phoenix, AZ (US); Devicharan Devidas, Bangalore (IN); Richard D. Carmichael, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 548 days.

(21) Appl. No.: 11/013,033

(22) Filed: Dec. 14, 2004

(65) Prior Publication Data

US 2006/0143331 A1 Jun. 29, 2006

(51) Int. Cl.
*G06F 11/00* (2006.01)
(52) U.S. Cl. ...................................... 714/43
(58) Field of Classification Search .............. 714/43, 714/47, 48, 2, 3, 18
See application file for complete search history.

(56) References Cited

U.S. PATENT DOCUMENTS 5,845,085 A * 12/1998 Gulick ..................... 709/236
6,717,910 B1 * 4/2004 Kasper et al. ............. 370/229
7,072,294 B2 * 7/2006 Kasper et al. ............. 370/229

OTHER PUBLICATIONS

Dell Computer Corp., et al., Serial ATA II: Extensions to Serial ATA 1.0 a, Revision 1.2, Aug. 27, 2004, 110 pages.

* cited by examiner

*Primary Examiner*—Nadeem Iqbal
(74) *Attorney, Agent, or Firm*—Blakely, Sokoloff, Taylor & Zafman LLP

(57) ABSTRACT

One embodiment of a method may include, in response, at least in part, to one or more received frames, generating an interrupt and preventing transmission of one or more other frames. The one or more received frames may indicate, at least in part, an error condition or a commencement of a data transfer. The method of this embodiment also may include, in response, at least in part, to the interrupt, executing one or more instructions. The one or more instructions, when executed, may optionally result in deleting the one or more other frames, and if the one or more received frames indicate, at least in part, the error condition, commencing recovery from the error condition. If the one or more received frames indicate, at least in part, the commencement of the data transfer, the method of the embodiment may include storing data associated with the data transfer.

16 Claims, 2 Drawing Sheets

RACE CONDITION PREVENTION

FIELD

This disclosure relates to race condition prevention.

BACKGROUND

In one conventional data storage arrangement, a host includes a host bus adapter (HBA) that is coupled to a target data storage device. The HBA exchanges data and commands with the target. The commands and data transmitted from the host to the target are first temporarily stored in a transmit queue in the HBA, and thereafter, a packet engine in the HBA transmits the queued commands and data to the target.

In this conventional arrangement, the HBA exchanges commands and data with the target in accordance with Serial Advanced Technology Attachment II (SATA II) protocol. SATA II protocol provides Native Command Queuing (NCQ) transactions that include four phases: command phase, register update phase, data phase, and completion phase. In order to comply with SATA II protocol, constraints are imposed on transmissions of commands and data in these phases. For example, after commencement of an NCQ data phase, no commands should be sent from the host to the target until after the data phase has been fully serviced, and only data that is properly associated with the data phase should be exchanged between the host and target. Also in order to comply with SATA II protocol, if the target indicates an error condition during an NCQ completion phase, no commands should be sent from the host to the target until after the host clears the target's error condition.

Unfortunately, depending upon the particular capabilities of the packet engine, the packet engine may be unable to distinguish between (1) commands and data stored in the transmit queue, and/or (2) data associated with a particular data phase and other data (e.g., associated with one or more other data phases) stored in the transmit queue. As a result, this conventional arrangement may enter a race condition in which the packet engine may transmit commands and/or data, when it is inappropriate to do so, given the above constraints of SATA II protocol. This may result in the target entering an unstable or metastable operating state, locking up of the target and/or host, and/or in corruption of data at the target (e.g., if the data phase was intended to involve a write of data from the host to the target).

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
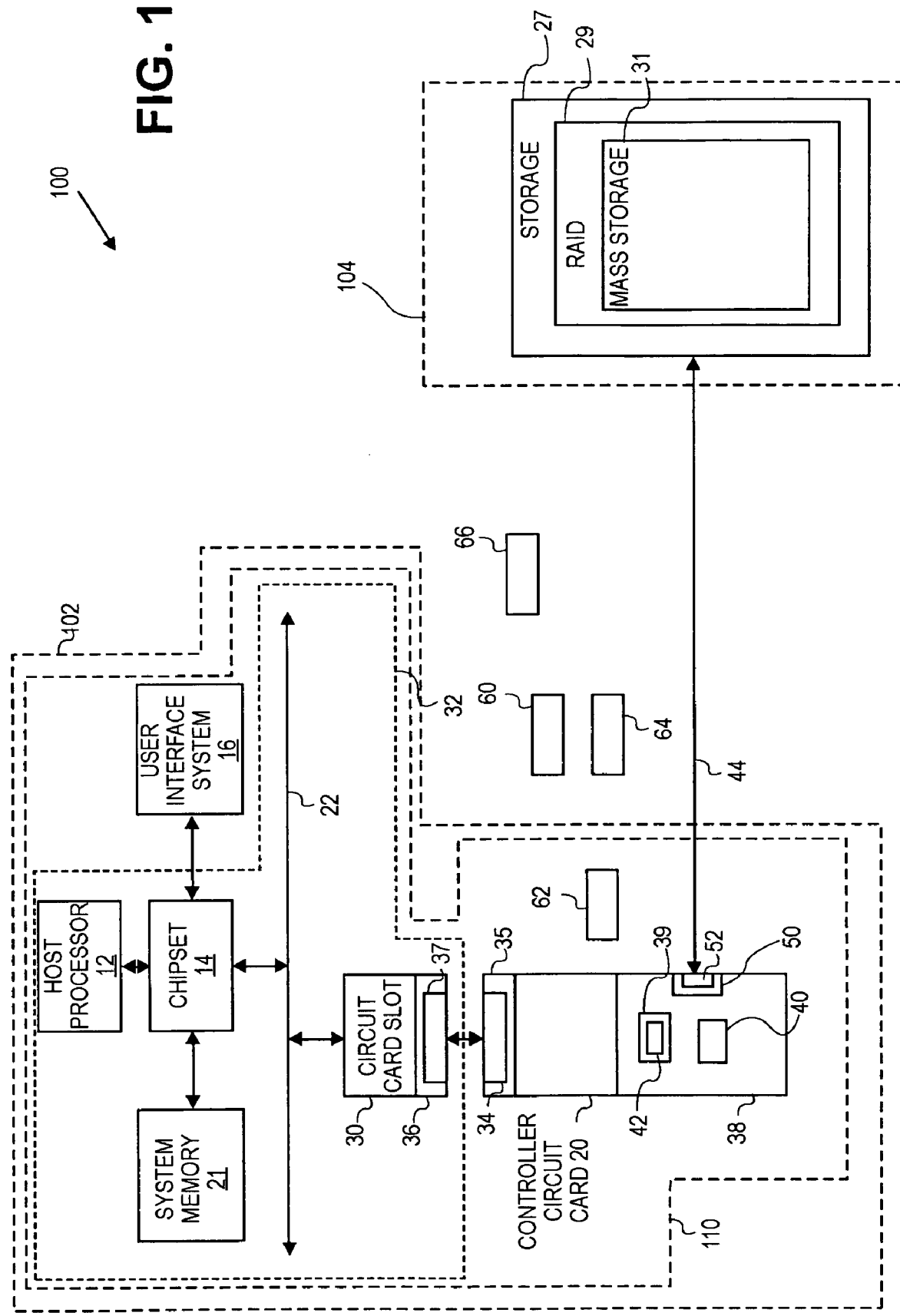
FIG. 1 is a diagram that illustrates a system embodiment.

FIG. 1 illustrates a system embodiment 100. System 100 may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, computer-readable system memory 21, and a user interface system 16 to each other and to a bus system 22. Chipset 14 may also include an input/output (I/O) bridge/hub system (not shown) that may couple the host bridge/bus system to bus 22. Chipset 14 may comprise one or more integrated circuit chips, such as those selected from integrated circuit chipsets commercially available from the assignee of the subject application (e.g., graphics memory and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

System embodiment 100 may comprise storage 27. Storage 27 may comprise a redundant array of independent disks (RAID) 29 including mass storage 31. Storage 27 may be communicatively coupled to an I/O controller circuit card 20 via one or more communication links 44. As used herein, "storage" means one or more apparatus and/or media into, and from which, data and/or commands may be stored and retrieved, respectively. Also as used herein, "mass storage" means storage that is capable of non-volatile storage of data and/or commands, and, for example, may include, in this embodiment, without limitation, magnetic, optical, and/or semiconductor storage devices. In this embodiment, card 20 may comprise, for example, an HBA. Of course, the number of storage devices that may be comprised in mass storage 31, RAID 29, and/or storage 27, and the number of communication links 44 may vary without departing from this embodiment.

The RAID level that may be implemented by RAID 29 may be 0, 1, or greater than 1. Depending upon, for example, the RAID level implemented in RAID 29, the number of mass storage devices that may be comprised in mass storage 31 may vary so as to permit the number of these mass storage devices to be at least sufficient to implement the RAID level implemented in RAID 29. Alternatively, without departing from this embodiment, RAID 29 and/or mass storage 31 may be eliminated from storage 27.

Processor 12, system memory 21, chipset 14, bus 22, and circuit card slot 30 may be comprised in a single circuit board, such as, for example, a system motherboard 32. Host computer system operative circuitry 110 may comprise system motherboard 32.

In this embodiment, card 20 may exchange data and/or commands with storage 27, RAID 29, and/or mass storage 31 via one or more links 44, in accordance with, e.g., a SATA II protocol. Of course, alternatively, I/O controller card 20 may exchange data and/or commands with storage 27, RAID 29, and/or mass storage 31 in accordance with other and/or additional communication protocols, without departing from this embodiment.

In accordance with this embodiment, if controller card 20 exchanges data and/or commands with storage 27, RAID 29, and/or mass storage 31 in accordance with an SATA II protocol, the SATA II protocol may comply or be compatible with the protocol described in "Serial ATA II: Extensions To Serial ATA 1.0a," Revision 1.2, published on Aug. 27, 2004 by the Serial ATA Working Group. For example, in accordance with this embodiment, an initiator 102 in accordance with SATA II protocol may comprise circuitry 110 and/or a portion of circuitry 110 (such as, for example, card 20, processor 40, and/or circuitry 38), and a target 104 in accordance with SATA II protocol may comprise storage 27 and/or a portion of storage 27 (such as, for example, RAID 29 and/or one or more storage devices comprised in mass storage 31). As is known to those skilled in the art, SATA II protocol NCQ permits a target to execute in parallel, at least in part, a plurality of data transfer requests from an initiator.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37 may be electrically and mechanically mated with a mating bus connector 34 that may be comprised in a bus expansion slot or interface 35 in circuit card 20.

As used herein, "circuitry" may comprise, for example, singly or in any combination, hardwired circuitry, programmable circuitry, state machine circuitry, and/or memory that may comprise program instructions that may be executed by programmable circuitry. In this embodiment, circuit card 20 may comprise operative circuitry 38 which may comprise computer-readable memory 39 and I/O processor 40. Memory 21 and/or memory 39 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 21 and/or memory 39 may comprise other and/or later-developed types of computer-readable memory.

I/O processor 40 may comprise, for example, an Intel® i960® RX, IOP310, and/or IOP321 I/O processor commercially available from the Assignee of the subject application. Of course, alternatively, I/O processor 40 may comprise another type of I/O processor and/or microprocessor, such as, for example, an I/O processor and/or microprocessor that is manufactured and/or commercially available from a source other than the Assignee of the subject application, without departing from this embodiment.

One or more machine-readable and executable program instructions 42 (e.g., firmware instructions) may be stored in memory 39 and/or (although not shown in FIG. 1) in memory 21. These instructions may be accessed and executed by host processor 12, I/O processor 40, circuitry 110, and/or circuitry 38. When executed by host processor 12, I/O processor 40, circuitry 110, and/or circuitry 38, these instructions may result in host processor 12, I/O processor 40, circuitry 110, and/or circuitry 38 performing the operations described herein as being performed by host processor 12, I/O processor 40, circuitry 110, and/or circuitry 38.

Slot 30 and card 20 may be constructed to permit card 20 to be inserted into slot 30. When card 20 is properly inserted into slot 30, connectors 34 and 36 become electrically and mechanically coupled to each other. When connectors 34 and 36 are so coupled to each other, circuitry 38 in card 20 becomes electrically coupled to bus 22 and may exchange data and/or commands with system memory 21, host processor 12, and/or user interface system 16 via bus 22 and chipset 14.

Alternatively, without departing from this embodiment, some or all of operative circuitry 38 may not be comprised in card 20, but instead, may be comprised in other structures, systems, and/or devices in system 100. These other structures, systems, and/or devices may be, for example, comprised in motherboard 32, coupled to bus 22, and exchange data and/or commands with other components (such as, for example, system memory 21, host processor 12, and/or user interface system 16) in system 100. For example, without departing from this embodiment, some or all of circuitry 38 and/or other circuitry (not shown) may be comprised in chipset 14, chipset 14 may be coupled to storage 27 via one or more links 44, and chipset 14 may exchange data and/or commands with storage 27 in a manner that is similar to the manner in which circuitry 38 is described herein as exchanging data and/or commands with storage 27.

Operative circuitry 38 may comprise transmit and receive packet engine circuitry 50 that may be coupled to target 104 (e.g., storage 27) via one or more links 44. Circuitry 50 may comprise transmit queue 52 that may store one or more frames. One or more frames 62 may comprise one or more data transfer requests intended to be issued to target 104. As used herein, the term "packet" and "frame" may be used interchangeably to refer to one or more symbols and/or one or more values.

Figure 2:
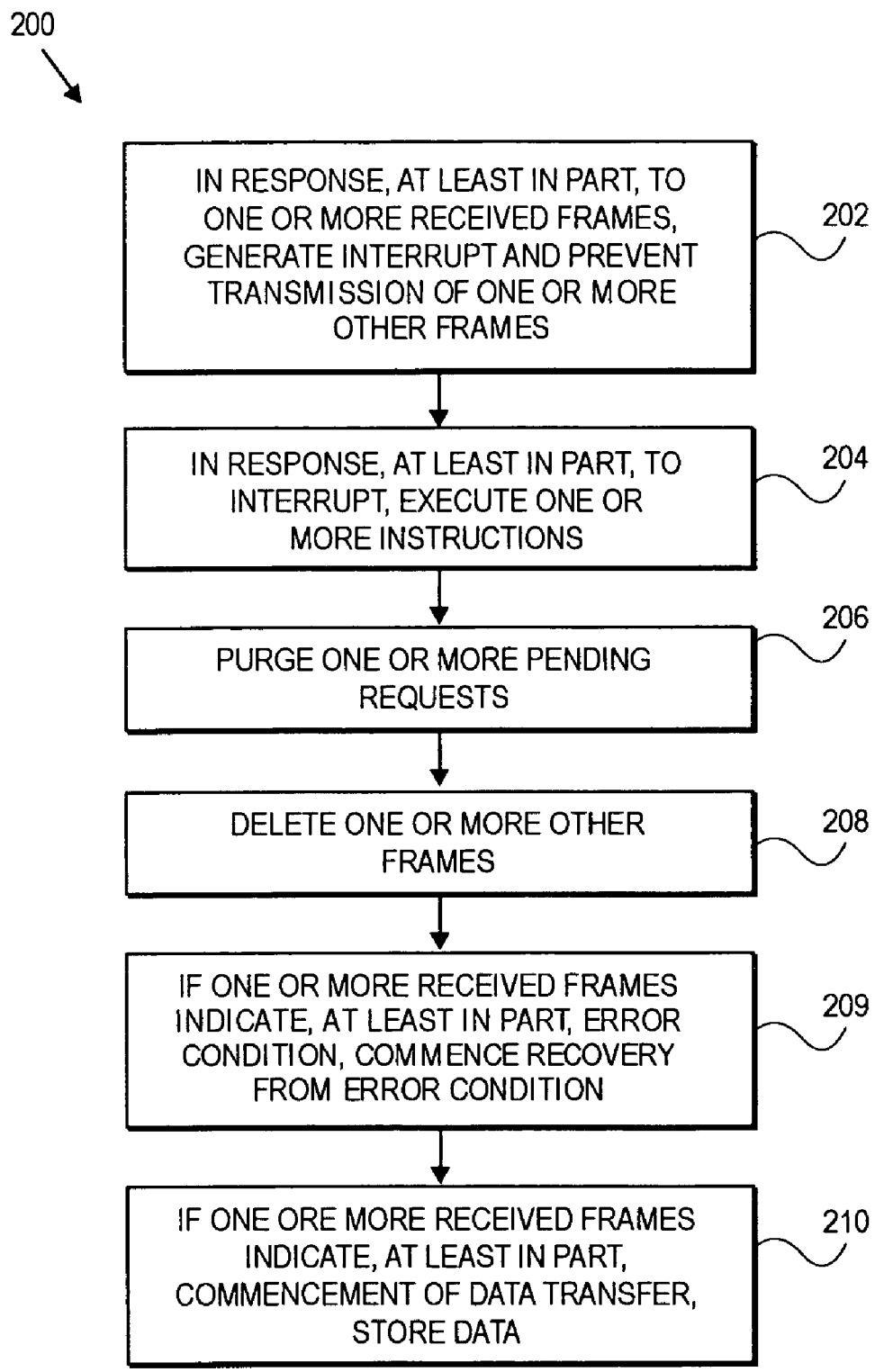
FIG. 2 is a flowchart illustrating operations that may be performed according to an embodiment.

With reference now being made to FIGS. 1 and 2, operations 200 will be described that may be performed in accordance with an embodiment. After, for example, a reset of system 100, host processor 12 may generate and issue to circuitry 38 a data transfer request that may request that data be transferred to and/or retrieved from storage 27. As used herein, a "data transfer request" means a request and/or command to transfer data. As used herein, "transferring data" means transmitting, reading, writing, storing, and/or retrieving data.

In response, at least in part, to receipt by circuitry 38 of the data transfer request from processor 12, I/O processor 40 may generate and temporarily store in transmit queue 52 one or more frames 66 that may be, comprise, and/or indicate, at least in part, a data transfer request that may correspond to the data transfer request issued by host processor 12. For example, one or more frames 66 may be or comprise a Register and/or Command Frame Information Structure (FIS) directed to and/or intended to be executed by target 104. After being initially stored in queue 52, circuitry 50 in initiator 102 may transmit one or more frames 66 to target 104.

After and/or in response at least in part to receiving one or more frames 66 from initiator 102, storage 27 in target 104, in accordance with SATA II protocol, may generate and issue to circuitry 50 in initiator 102 one or more frames 64 and/or one or more frames 60. One or more frames 64 may indicate, at least in part, commencement of the data transfer requested by one or more frames 66. One or more frames 60 may indicate, at least in part, an error condition.

In this embodiment, one or more frames 64 may comprise one or more Direct Memory Access (DMA) Setup FIS. For example, if the data transfer request issued by host processor 12 requested a read operation involving transfer of data from storage 27 to host processor 12, one or more frames 64 may indicate, at least in part, a direction of data transfer (e.g., from target 104 to initiator 102) and the SATA II tag associated with the data transfer (e.g., the tag that was assigned to and/or associated with the Register and/or Command FIS comprised in one or more frames 66).

Also in this embodiment, one or more frames 60 may be issued during a completion phase of the data transfer transaction between initiator 102 and target 104. If an error condition exists (e.g., a NCQ failure occurred in the transaction), one or more frames 60 may comprise one or more SetDeviceBits (SDB) FIS in which an error bit (ERR) in the status field of the FIS is set (e.g., set equal to unity).

In response, at least in part, to receipt of one or more frames 64 and/or 60 by circuitry 50, circuitry 50 may generate and issue to processor 40 an interrupt, and also may prevent transmission from circuitry 50 of one or more frames (e.g., one or more frames 62), currently stored in transmit queue 52, as illustrated by operation 202 in FIG. 2. For example, in this embodiment, one or more frames 62 may comprise one or more command frames that may comprise one or more commands (e.g., data transfer requests) directed to and/or intended to be executed by target 104, and/or one or more frames 62 may comprise one or more other types of frames (e.g., data frames). Circuitry 50 (e.g., receiver circuitry comprised in circuitry 50) may be capable of examining one or more frames that circuitry 50 may receive from initiator 104 to determine whether the one or more received frames indicate, at least in part, an error condition (for example, as is the case with one or more received frames 60) or commencement of a data transfer (e.g., as is the case with one or more received frames 64). If circuitry 50 determines that one or more frames 64 indicate, at least in part, such an error condition or commencement of a data transfer, then as part of operation 202, circuitry 50 may generate and issue to processor 40 an interrupt, and circuitry 50 also may prevent transmission of one or more frames 62 by circuitry 50 (e.g., by temporarily delaying, stalling, and/or freezing transmission of one or more frames 62, currently stored in queue 52, from queue 52) to target 104. In accordance with this embodiment, the execution by circuitry 50 of operation 202 may be completed, at least in part, prior to validation (e.g., by examination and/or computation of cyclic redundancy check information of and/or for one or more frames 60 and/or 64) by circuitry 50 of one or more frames 60 and/or 64. Advantageously, this may reduce the complexity and cost of the circuitry 50 and/or circuitry 38.

In response, at least in part, to the interrupt, processor 40 may execute (e.g., as an exception) one or more instructions (e.g., one or more instructions 42), as illustrated by operation 204. When one or more instructions 42 are executed by processor 40, this may result in processor 40 purging one or more pending requests associated with transmit queue 52 (e.g., one or more pending requests in internal queues maintained by firmware that may feed or supply inputs to transmit queue 52), as illustrated by operation 206. Alternatively or additionally, when one or more instructions 42 are executed by processor 40, this may result in processor 40 examining and deleting one or more frames 62 from queue 52 that may comprise one or more commands directed to and/or intended to be executed by target 104, as illustrated by operation 208. In the context of this embodiment, the deleting of one or more frames 62 may comprise eliminating and/or removing one or more frames 62 from card 20. Also in the context of this embodiment, the purging of one or more pending requests associated with transmit queue 52 may comprise the eliminating and/or removing of one or more pending requests from transmit queue 52. Of course, without departing from this embodiment, in the context of this embodiment, the purging of an item may comprise or be synonymous with the deleting of an item, or vice versa. Also without departing from this embodiment, in the context of this embodiment, purging and/or deleting may have other and/or additional meanings.

If circuitry 50 generated the interrupt to processor 40 in response at least in part to receipt of one or more frames 60 that indicate, at least in part an error condition, the execution of one or more instructions 42 by processor 40 may result in processor 40 commencing recovery from the error condition that is being indicated, at least in part, by one or more frames 60, as illustrated by operation 209. This may comprise, for example, processor 40 determining the nature and/or type of error condition, performing and/or initiating performance of one or more operations to correct and/or ameliorate the error condition (e.g., retransmission of the data intended to be transferred during the data transfer), and/or indicating to the target 104 clearance of the error condition (e.g., by issuing a READ LOG EXT Page 10h command to the target 104). Thereafter, one or more frames stored in queue 52 may be transmitted to target 104.

If circuitry 50 generated the interrupt to processor 40 in response at least in part to receipt of one or more frames 64, and one or more frames 64 indicate, at least in part, commencement of data transfer from target 104 to initiator 102, the execution of one or more instructions 42 by processor 40 may result in processor 40 storing in memory 39 and/or in a receive queue in circuitry 50 data received from storage 27, as illustrated by operation 210. Alternatively, as part of operation 210, if circuitry 50 generated the interrupt to processor 40 in response at least in part to receipt of one or more frames 64, and one or more frames 64 indicate, at least in part, commencement of data transfer from initiator 102 to target 104, the execution of one or more instructions 42 by processor 40 may result in processor 40 storing in memory 39 and/or transmit queue 52 data to be transmitted to storage 27.

After operation 209 and/or operation 210 have been executed, the execution by processor 40 of one or more instructions 42 may result in processor 40 storing one or more values in one or more control registers (not shown) that may clear the interrupt generated by circuitry 50 in operation 202, and may command circuitry 50 to stop preventing one or more frames that may be stored in transmit queue 52 from being transmitted to target 104. Thereafter, one or more frames stored in queue 52 may be transmitted to target 104. As a part of operation 202, one or more other values may have been stored by circuitry 50 in these one or more registers to indicate, at least in part, the interrupt, and that circuitry 50 was preventing one or more frames 62 from being transmitted to target 104.

Thus, one system embodiment may comprise a circuit card capable of being inserted in a circuit card slot that is comprised in a circuit board. The circuit card may comprise circuitry to, in response, at least in part, to one or more received frames, generate an interrupt and prevent transmission of one or more other frames. The one or more received frames may indicate, at least in part, an error condition or a commencement of a data transfer. The circuitry may be capable of, in response, at least in part, to the interrupt, execute one or more instructions. The one or more instructions, when executed, may optionally result in deleting of the one or more frames. The one or more instructions, when executed, may result in, if the one or more received frames indicate, at least in part, the error condition, commencing of recovery from the error condition. If the one or more received frames indicate, at least in part, the commencement of the data transfer, the one or more instructions, when executed, may result in storing of data associated with the data transfer.

In this system embodiment, even if a packet engine is unable to distinguish between (1) commands and data stored in the transmit queue, and/or (2) data associated with a particular data phase and other data (e.g., associated with one or more other data phases) stored in the transmit queue, the features of this system embodiment may prevent the packet engine from transmitting commands and/or data to a target when it is inappropriate to do so. Advantageously, this may permit the system embodiment to include relatively simple, smaller, and inexpensive packet engine (e.g., with fewer gates and/or logic circuitry than a packet engine that is capable of qualifying, classifying, and/or tracking each frame and frame type in the transmit queue), while still being able to prevent the target from entering the previously described type of race condition, unstable or metastable operating state, locking up of the target and/or host, and/or corruption of data at the target (e.g., if the data phase was intended to involve a write of data from the host to the target) that may occur in the previously described type of conventional arrangement.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

For example, the interrupt generated as a result of operation 202 may be masked to permit transfer of data from the target 104 to initiator 102 to be completed. Thereafter, a remainder of operations 200 may be executed in the manner previously described.

Other modifications are also possible. Accordingly, the claims are intended to cover all such equivalents.

What is claimed is:

1. A method for interacting with a Serial Advanced Technology Attachment II ("SATA II") target comprising:
   enqueueing a plurality of frames in a transmit queue, said plurality of frames including at least one command packet and at least one data packet, and said plurality of frames to be transmitted to a SATA II target:
   transmitting a frame from the transmit queue to the SATA II target without distinguishing between a command packet and a data packet;
   receiving a received frame from the SATA II target while at least one remaining frame of the plurality of frames remains in the transmit queue:
   if the received frame indicates, at least in part, one of an error condition or a commencement of a data transfer, generating an interrupt and preventing transmission of the at least one remaining frame in the transmit queue; and
   in response to the interrupt,
   if the received frame indicates, at least in part, the error condition. commencing recovery from the error condition; and
   if the received frame indicates, at least in part, the commencement the data transfer, storing data associated with the data transfer,
   wherein the operations in response to the interrupt are performed by a programmable processor executing one or more instructions.

2. The method of claim 1, wherein:
   the received frame comprises a Direct Memory Access (DMA) Setup Frame Information Structure (FIS).

3. The method of claim 1, wherein:
   the received frame comprises a Set Device Bits Frame Information Structure (FIS).

4. The method of claim 1, wherein the operations in response to the interrupt further comprise:
   deleting the at least one remaining frame.

5. The method of claim 1, wherein:
   the generating of the interrupt and the preventing of the transmission of the one or more other frames occur prior, at least in part, to a validation of the received frame.

6. The method of claim 1, wherein:
   the method further comprises deleting the one or more other frames;
   prior to the deleting of the one or more other frames, the one or more other frames are in a transmit queue; and
   the one or more instructions, when executed, also result in purging one or more pending requests associated with the transmit queue.

7. An apparatus comprising:
   transmit queue circuitry to maintain a queue of frames, said frames to be transmitted to a Serial Advanced Technology Attachment II ("SATA II") target without distinguishing between a command frame and a data frame;
   receiver circuitry to receive a frame from the SATA II target:
   blocking circuitry to prevent transmission of frames by the transmit queue circuitry if the received frame indicates, at least in part, an error condition or a commencement of a data transfer;
   interrupt circuitry to issue an interrupt to a programmable processor if the received frame indicates, at least in part, an error condition or a commencement of a data transfer; and
   instructions to cause the programmable processor to perform operations comprising:
   if the received frame indicates, at least in part, an error condition, then commencing recovery from the error condition; and
   if the received frame indicates, at least in part, the commencement of the data transfer, then storing data associated with the data transfer, said operations to be performed in response to the interrupt.

8. The apparatus of claim 7, wherein:
   the received frame comprises a Direct Memory Access (DMA) Setup Frame Information Structure (FIS).

9. The apparatus of claim 7, wherein:
   the received frame comprises a Set Device Bits Frame Information Structure (FIS).

10. The apparatus of claim 7, wherein the instructions are to cause the programmable processor to perform additional operations comprising:
    deleting at least one frame from the queue of frames.

11. The apparatus of claim 7, wherein:
the interrupt circuitry and the blocking circuitry operate prior, at least in part, to a validation of the received frame.

12. The apparatus of claim 7, wherein:
the transmit queue circuitry also is capable of deleting one or more frames from the queue of frames;
prior to the deleting of the one or more frames, the one or more frames are in the queue of frames; and wherein
the instructions are to cause the programmable processor to perform additional operations comprising:
purging one or more pending requests associated with the queue of frames.

13. A system comprising:
a circuit card capable of being inserted in a circuit card slot that is comprised in a circuit board, the circuit card comprising:
transmit queue circuitry to maintain a queue of frames, said frames to be transmitted to a Serial Advanced Technology Attachment II ("SATA II") target without distinguishing between a command frame and a data frame;
receiver circuitry to receive a frame from the SATA II target;
blocking circuitry to prevent transmission of frames by the transmit queue circuitry if the received frame indicates, at least in part, an error condition or a commencement of a data transfer;
interrupt circuitry to issue an interrupt to a programmable processor if the received frame indicates, at least in part, an error condition or a commencement of a data transfer; and
instructions to cause the programmable processor to perform operations comprising:
if the received frame indicates, at least in part, an error condition, then commencing recovery from the error condition; and
if the received frame indicates, at least in part, the commencement of the data transfer, then storing data associated with the data transfer,
said operations to be performed in response to the interrupt.

14. The system of claim 13, further comprising the circuit board.

15. The system of claim 14, wherein:
the circuit board also comprises the programmable processor and a bus via which the programmable processor is coupled to the slot.

16. The system of claim 13, further comprising:
storage coupled to the card via one or more communication links.

* * * * *